July 31, 1923.

E. D. STOUT

HEATER

Filed Jan. 7, 1922

1,463,730

WITNESSES
Oliver W. Holmes
P. H. Pattison

INVENTOR
E. D. STOUT
BY
ATTORNEYS

Patented July 31, 1923.

1,463,730

UNITED STATES PATENT OFFICE.

EDWARD DUMONT STOUT, OF NEW ROCHELLE, NEW YORK, ASSIGNOR TO WM. H. JACKSON COMPANY, OF NEW YORK, N. Y., A CORPORATION OF NEW YORK.

HEATER.

Application filed January 7, 1922. Serial No. 527,689.

*To all whom it may concern:*

Be it known that I, EDWARD D. STOUT, a citizen of the United States, and a resident of New Rochelle, in the county of Westchester and State of New York, have invented a new and Improved Heater, of which the following is a full, clear, and exact description.

The present invention relates to new and useful improvements in heaters and it pertains more particularly to heaters of the electric type.

It is one of the objects of the invention to provide a permanent and stationary heater of the electric type especially adapted for bathrooms and similar localities.

It is a further object of the invention to construct a device of this character as a wall heater, that is, a heater which is permanently mounted within a recess in the wall and so constructed that the outer portion thereof is in imitation of an ordinary hot-air register.

It is a still further object of the invention to so construct this heater that it may be set into a wall with its outer face flush with the surface thereof.

With the above and other objects in view, reference is had to the accompanying drawings, in which—

Figure 1:
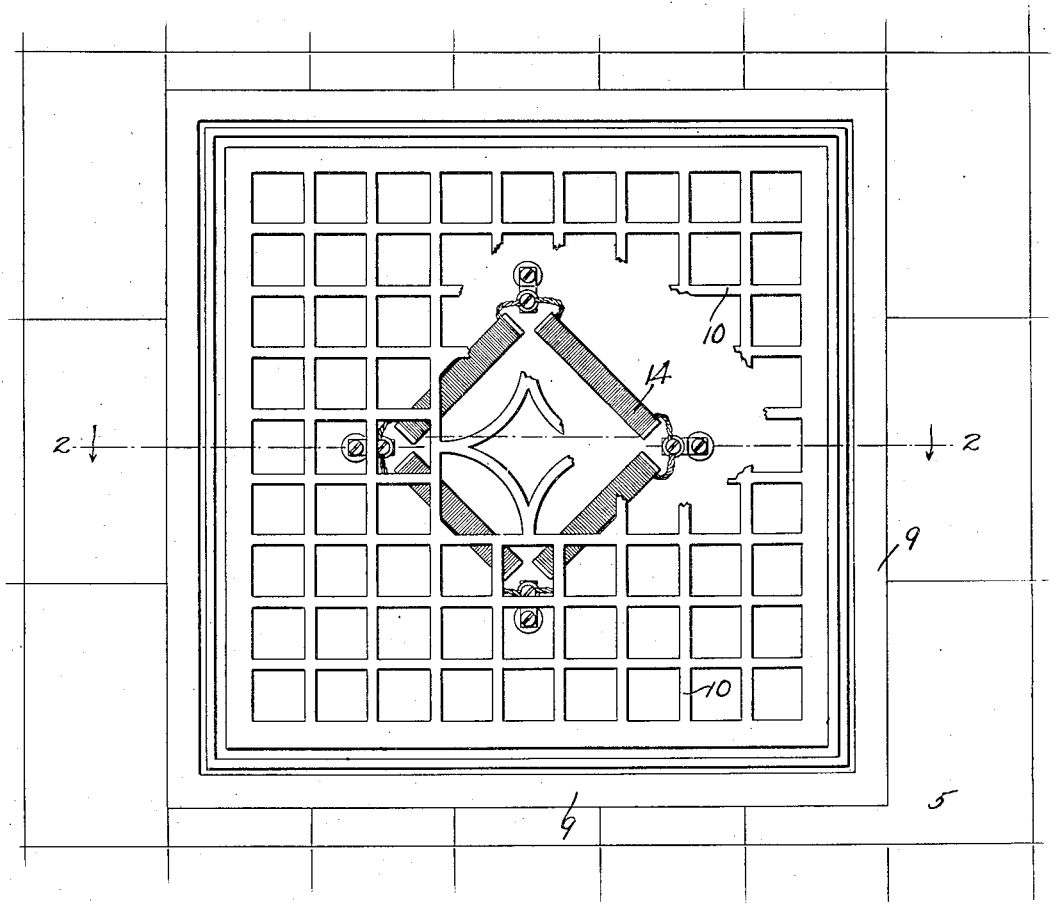
Figure 1 is a front elevation of a heater constructed in accordance with the present invention, a portion of the housing of the heater being broken away.
Figure 2:
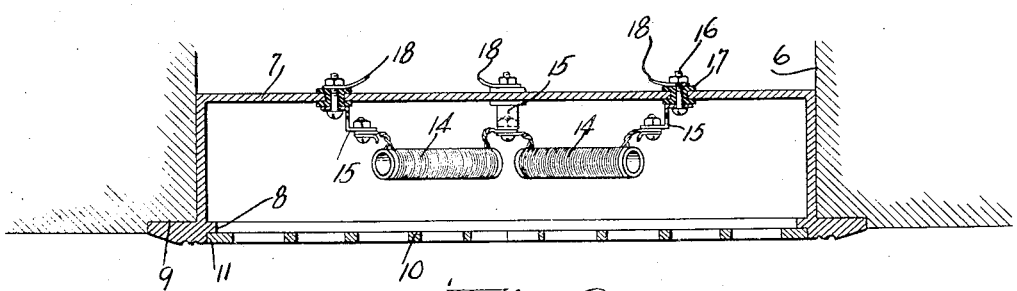
Fig. 2 is a sectional view taken on the line 2—2 of Fig. 1.

Referring more particularly to the drawings, the reference character 5 designates a wall and said wall is formed with a recess or the like 6. Mounted within this recess 6 is a housing 7 of sheet metal or other suitable material, and said housing is formed on its forward face with an open portion 8 and a projecting flange 9. The flange 9 is adapted to engage the wall 5 about the edge of the recess 6 as more clearly shown in Fig. 2.

The reference character 10 designates a grill and said grill is adapted to be received within a channel 11 formed in the flange 9 of the housing 7.

Secured to the rear wall of the housing is a plurality of heating elements 14 of the electric type, and said heating elements are mounted upon brackets 15, which in turn are secured to the rear wall of the housing by means of bolts 16 or the like, insulated therefrom by means of insulating material 17. Power is supplied to the heating elements 14 by suitable conductors 18 connected to any suitable source of electric current supply.

By this construction it is apparent that the present invention provides a new and improved heater especially adapted for bathrooms and the like. Furthermore, the entire heater is constructed as a unit and is capable of attachment to walls by setting within a recess formed therein.

I claim:

As an article of manufacture a permanent heater adapted to be attached to the wall of a room, said heater comprising a housing having an open side, a grill for closing the open side of the housing, a plurality of brackets carried by and projecting from the rear wall of the housing and insulated with respect thereto, and a plurality of heating elements carried by said brackets substantially as described.

EDWARD DUMONT STOUT.